United States Patent
Mandal et al.

(10) Patent No.: US 10,847,137 B1
(45) Date of Patent: Nov. 24, 2020

(54) TRIGGER WORD DETECTION USING NEURAL NETWORK WAVEFORM PROCESSING

(71) Applicant: Amazon Technologies, Inc., Seattle, WA (US)

(72) Inventors: Arindam Mandal, Seattle, WA (US); Nikko Strom, Kirkland, WA (US); Kenichi Kumatani, Seattle, WA (US); Sankaran Panchapagesan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 15/838,765

(22) Filed: Dec. 12, 2017

(51) Int. Cl.
| | |
|---|---|
| *G10L 15/00* | (2013.01) |
| *G10L 15/16* | (2006.01) |
| *G10L 15/22* | (2006.01) |
| *G10L 15/06* | (2013.01) |
| *G10L 15/08* | (2006.01) |

(52) U.S. Cl.
CPC ............ G10L 15/16 (2013.01); G10L 15/063 (2013.01); G10L 15/22 (2013.01); *G10L 2015/0635* (2013.01); *G10L 2015/088* (2013.01)

(58) Field of Classification Search
CPC .. G06F 11/3447; G06F 11/3452; G06F 7/483; G06F 17/18; G06F 16/906; G06F 17/2818; G10L 15/16; G10L 25/30; G10L 15/02; G10L 17/18; G10L 19/0212; G10L 2021/02082; G10L 2021/02087; G10L 2021/02166; G10L 21/02; G10L 21/0216; G10L 21/0264; G10L 25/18; G10L 25/54
See application file for complete search history.

(56) References Cited

U.S. PATENT DOCUMENTS

| | | | | |
|---|---|---|---|---|
| 9,443,517 | B1* | 9/2016 | Foerster | G10L 15/08 |
| 10,304,475 | B1* | 5/2019 | Wang | G01S 3/80 |
| 10,319,374 | B2* | 6/2019 | Catanzaro | G10L 15/02 |
| 2007/0136058 | A1* | 6/2007 | Jeong | G10L 15/08 704/240 |
| 2014/0288928 | A1* | 9/2014 | Penn | G10L 15/16 704/232 |
| 2015/0106085 | A1* | 4/2015 | Lindahl | G10L 15/32 704/231 |
| 2015/0127594 | A1* | 5/2015 | Parada San Martin | G06N 3/0454 706/16 |

(Continued)

OTHER PUBLICATIONS

Y. Lecun, L. Bottou, Y. Bengio and P. Haffner, "Gradient-based learning applied to document recognition," in Proceedings of the IEEE, vol. 86, No. 11, pp. 2278-2324, Nov. 1998.*

(Continued)

*Primary Examiner* — Michael Ortiz-Sanchez
(74) *Attorney, Agent, or Firm* — Occhiuti & Rohlicek LLP

(57) ABSTRACT

An approach to speech recognition, and in particular trigger word detection, implements fixed feature extraction form waveform samples with a neural network (NN). For example, rather than computing Log Frequency Band Energies (LFBEs), a convolutional neural network is used. In some implementations, this NN waveform processing is combined with a trained secondary classification that makes use of phonetic segmentation of a possible trigger word occurrence.

16 Claims, 8 Drawing Sheets

(56) References Cited

U.S. PATENT DOCUMENTS

| | | | |
|---|---|---|---|
| 2015/0340032 A1* | 11/2015 | Gruenstein | G10L 15/16 704/232 |
| 2016/0092766 A1* | 3/2016 | Sainath | G10L 25/30 706/20 |
| 2016/0379108 A1* | 12/2016 | Chung | G06N 3/04 706/27 |
| 2017/0084269 A1* | 3/2017 | Shi | G10L 15/063 |
| 2017/0162203 A1* | 6/2017 | Huang | G10L 15/285 |
| 2017/0169327 A1* | 6/2017 | Nestler | G06N 3/04 |
| 2017/0256255 A1* | 9/2017 | Bocklet | G10L 15/10 |
| 2017/0301341 A1* | 10/2017 | Tyagi | G10L 15/14 |
| 2017/0351487 A1* | 12/2017 | Aviles-Casco Vaquero | G10L 17/00 |
| 2018/0005633 A1* | 1/2018 | Bocklet | G10L 17/04 |
| 2018/0061404 A1* | 3/2018 | Devaraj | G10L 15/22 |
| 2018/0144242 A1* | 5/2018 | Simard | G06N 3/084 |
| 2018/0277096 A1* | 9/2018 | Li | G10L 15/02 |

OTHER PUBLICATIONS

S. Thomas, S. Ganapathy, G. Saon and H. Soltau, "Analyzing convolutional neural networks for speech activity detection in mismatched acoustic conditions," 2014 IEEE International Conference on Acoustics, Speech and Signal Processing (ICASSP), Florence, 2014, pp. 2519-2523.*

Sainath, Tara N., Ron J. Weiss, Andrew Senior, Kevin W. Wilson, and Oriol Vinyals. "Learning the speech front-end with raw waveform CLDNNs." In Sixteenth Annual Conference of the International Speech Communication Association, 5 pages. 2015.

Bhargava, Mayank, and Richard Rose. "Architectures for deep neural network based acoustic models defined over windowed speech waveforms." In Sixteenth Annual Conference of the International Speech Communication Association, pp. 6-10. 2015.

Gehring, Jonas, Wonkyum Lee, Kevin Kilgour, Ian R. Lane, Yajie Miao, Alex Waibel, and Silicon Valley Campus. "Modular combination of deep neural networks for acoustic modeling." In INTERSPEECH, pp. 94-98. 2013.

Hoshen, Yedid, Ron J. Weiss, and Kevin W. Wilson. "Speech acoustic modeling from raw multichannel waveforms." In Acoustics, Speech and Signal Processing (ICASSP), 2015 IEEE International Conference on, pp. 4624-4628. IEEE, 2015.

Grezl, Frantisek, and Petr Fousek. "Optimizing bottle-neck features for LVCSR." In Acoustics, Speech and Signal Processing, 2008. ICASSP 2008. IEEE International Conference on, pp. 4729-4732. IEEE, 2008.

Grézl, František, and Martin Karafiát. "Hierarchical neural net architectures for feature extraction in ASR." In Eleventh Annual Conference of the International Speech Communication Association, pp. 1201-1204. 2010.

* cited by examiner

TRIGGER WORD DETECTION USING NEURAL NETWORK WAVEFORM PROCESSING

BACKGROUND

This invention relates to speech recognition using a neural network based waveform processing, and more particularly relates to a trigger word detection approach that uses such waveform processing.

One approach to providing a speech-based user interface for a speech-enabled system is to use a device that monitors an acoustic environment waiting for a user to speak a command that can be interpreted by the system. The system may determine when the speaker intends to interact via the interface by determining when the speaker utters a particular word or phrase designed to "wake" the system. Such a word or phrase may be referred to as a "trigger word" or a "wake word."

Speech recognition used to determine the words spoken and further understand the intent of the speaker may be computationally expensive, and may be beyond the computational capacity of devices that may be located in the acoustic environment being monitored. One approach to addressing the limited computational capacity of such devices is to perform some of the computation on a server coupled to the devices over a data network, for instance over the public Internet. In some such approaches, the devices send audio data to the server only after a speaker utters the trigger word, and the server performs much of the computation required to interpret the speaker's input.

DETAILED DESCRIPTION

An approach to trigger word detection is described herein in which an input sampled waveform containing speech, referred to as a "speech signal," is processed directly using a parameterized non-linear transformation, in particular using an artificial neural network (ANN) implementing such a transformation with the output of that ANN being used for further recognition and trigger word detection. Optionally, the trigger word detection uses a further ANN-implemented non-linear transformation or classification to finalize a determination of whether the trigger word occurred at a particular time in the sampled waveform.

As discussed in more detail below, in one embodiment, the trigger word detection approach is implemented in an audio device that senses an acoustic environment, and detects when a user utters a specified trigger word as part of a command to a speech-recognition enabled system. For example, the user may speak "Alexa, what is the temperature outside", and the trigger word detection approach detects (e.g., determines the presence of and/or time location of) "Alexa", and once detected, the audio device causes the remainder of the utterance to be processed. For example, the sampled waveform may be transmitted to a server computer, which performs further speech recognition and natural language understanding and then passes a representation of the meaning of the command back to the audio device.

Figure 1:
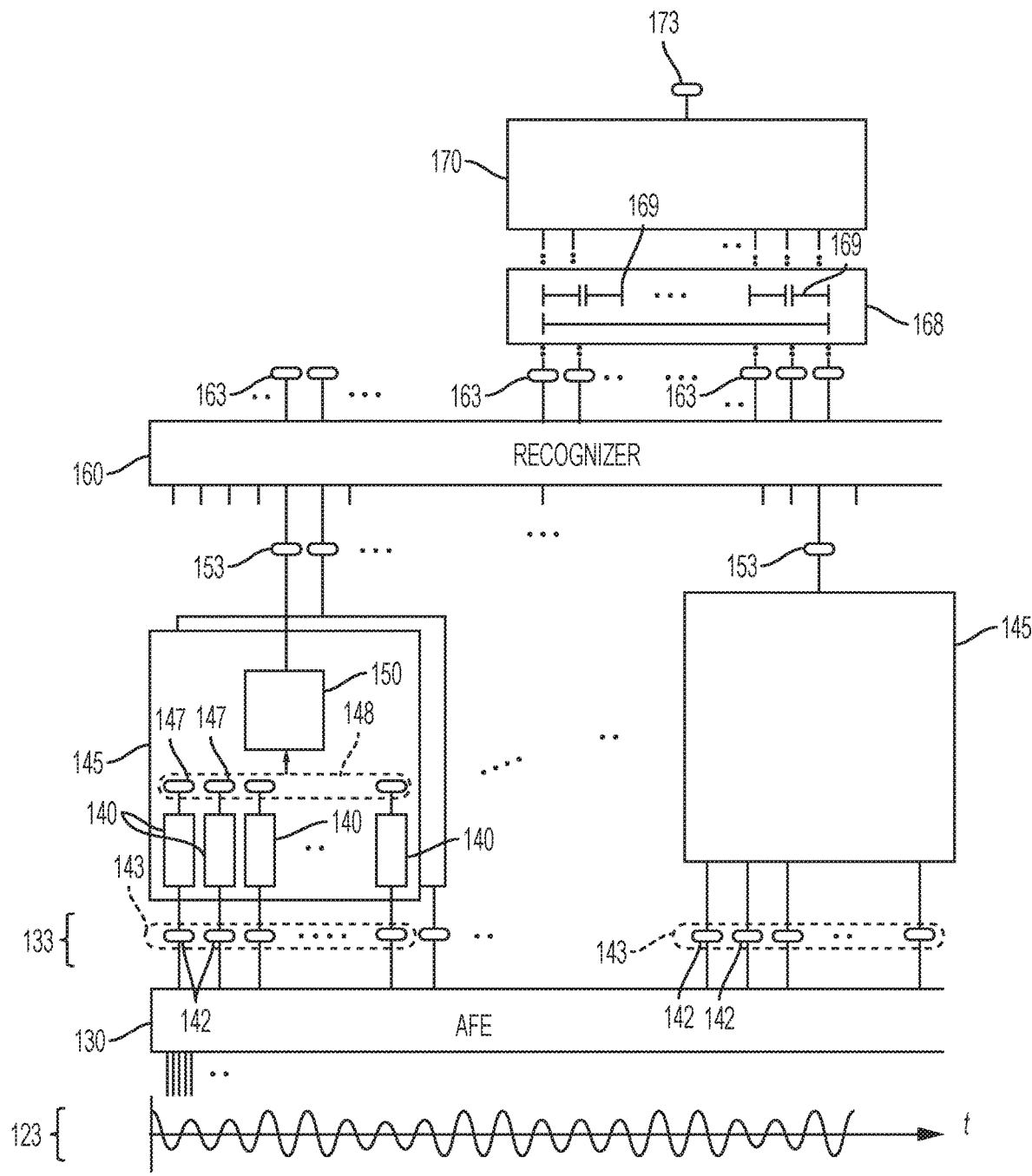
FIG. 1 is a diagram illustrating a trigger word detection approach.

Referring to FIG. 1, a sampled waveform 123 is an input to the approach representing an acoustic signal acquired by the audio device from the acoustic environment. In the embodiment described below, the waveform is sampled at 16,000 samples per second, which is sufficient to capture the audio band of human speech, but it should be recognized that other sampling rates can be used. In this embodiment, the waveform values (also referred to as waveform samples) are provided in digital form, for example, as 12-bit numbers representing a linear encoding of the waveform values. Other numbers of bits, and non-linear encodings rather than linear encodings may be used, such as 8-bit mu-law encoding. Furthermore, although the embodiment described below uses digital (i.e., binary encoded numerical) processing of the input, other embodiments may use analog (e.g., a voltage-based) representations and analog processing, and therefore the digital nature of the processing should not be viewed as essential.

Optionally, and as shown in FIG. 1, the input sampled waveform 123 is processed by an acoustic front end (AFE) 130 to produce a processed sampled waveform 133. One function of this front end may be to multiply by a global scaling factor (which may be referred to as a gain) as well as to add an offset to the sampled waveform values. In this embodiment, the gain and offset are selected such that the processed sampled waveform has samples with a zero average and unit (or other predetermined constant) variance. The AFE 130 may also perform other functions, for instance, acoustic echo cancellation, spectral equalization, and directional beamforming using multiple raw waveforms 123 from multiple microphones. But it should be recognized that the AFE 130 is not essential, and that the further waveform processing described below operating on the processed sampled waveform 133 may alternatively work directly on the raw sampled waveform 123.

Successive sections 143 of the processed sampled waveform 133 are then processed by a waveform processor 145, with each section corresponding to a particular time in the waveform. In the discussion below, a "time" in a waveform should be understood mean either an instant or a time interval in the waveform. In this embodiment, each section 143 of the sampled waveform 133 corresponds to approximately 325 ms. in duration of the acquired acoustic signal (i.e., 5,200 samples of the input waveform 123 at the sampling rate of 16,000 samples per second). As discussed further below, each section 143 is further decomposed into smaller overlapping sections 142 with the larger section 143, and each of these smaller sections is processed by the waveform processor. The larger sections 143 that are processed overlap, such that each successive section is 10 ms. later than the previous section (i.e., a step size of 10 ms. or 160 samples), such that 315 ms. of the next section overlaps with the previous section and 10 ms. of the next section has new waveform samples that have not yet been processed. The size of the sections and the step sizes may be different in other embodiments without necessarily departing from the general approach. Note that in FIG. 1, multiple instances of the waveform processor 145 illustrate multiple applications (e.g., executions of code or use of a circuit implementation) of the same waveform processor (although in alternative embodiments multiple such processors could be used in parallel to increase processing speed).

The output of the waveform processor 145 for each section 143 of the sampled waveform 133 is a vector of quantities referred to as state likelihoods 153, with each element of the vector corresponding to an acoustically- and/or linguistically-defined unit of speech (generally referred to as an acoustic unit below). In particular, as discussed more fully below, in this embodiment, each element of the output vector corresponds to a different state of a phonetically-based Markov chain model of the expected input speech, with the vector having N=45 real-valued elements corresponding to N states of the model. In other embodiments, the Markov chain model may have a different number of states and the output of the waveform processor 145 would have a corresponding number of outputs. Each element of the vector represents a likelihood (or alternatively a probability) of the corresponding state based on the input to the waveform processor. In this discussion, a "probability" (or more precisely a conditional probability conditioned on a section of the sample waveform input) of a recognizer state (which may be referred to as simply a state for brevity) in general is a quantity between 0.0 and 1.0, while a "likelihood" of that state is a non-negative quantity that is a ratio of a conditional probability of the state and an unconditional (i.e., prior) probability of the state. Therefore, in this embodiment, the waveform processor 145 implements a transformation of a section 143 of 5,200 input waveform sample values to a N-dimensional vectors of state likelihoods 153 as output.

As introduced above, the waveform processor 145 implements a parameterized non-linear transformation of the waveform samples that is configured with values of parameters that define the transformation. In particular, the processor includes an artificial neural network (ANN) in which the non-linear transformation is parameterized by weights of the ANN. These weights are determined using a parameter determination (also referred to as "training") procedure, which is described in more detail later in this document.

The waveform processor 145 can be considered to be composed to two stages. A first stage is denoted as a "feature extractor" stage without intending to connote any particular function or structure by that denotation. The feature extraction stage is implemented by repeated use of a feature extractor 140 to process the successive smaller sections 142 of the sampled waveform that make up the section 143 forming the complete input section to the waveform processor. The front end 140 produces respective processed input sections 147 each corresponding to one of the sections 142. The processed input sections 147 resulting from the multiple uses of the feature extractor 140 are combined (e.g., concatenated) and used as an input 148 to a second stage of the waveform processor 145. This second stage is denoted as a "feature analysis" (also referred to as an "acoustic model") stage that includes a feature analyzer 150, again without intending to connote any particular function or structure. The feature analyzer 150 produces as output the state likelihoods 153 introduced above.

More specifically in this embodiment, the feature extractor 140 uses as input a section 142 of sampled waveform values corresponding to 25 ms. of input. At 16,000 samples per second, this means that there are 400 input values to the feature extractor. For one application of the waveform processor 145 there are multiple applications of the feature extractor, in this embodiment 31 applications, recognizing that in other embodiments fewer than or greater than 31 applications may be used. For each successive application of the feature extractor 140 the input is shifted by 10 ms., so that 15 ms. (240 samples) of input overlaps with the input for the previous application of the feature extractor and 10 ms. (160 samples) are new. Therefore, with 31 applications of the feature extractor 140, the input section 143 that is processed corresponds to 325 ms. (5,200 samples). This range of 31 sections is considered to include one section associated with a current time (e.g., with a 25 ms. section of the sampled waveform), 10 sections in the "future", and 20 sections in the "past", for the total of 31 sections.

Each application of the feature extractor 140 processes a section 142 having 400 input values, which can be considered to be a 400-dimensional real- or integer-valued vector, and produces a corresponding K-dimensional vector of the processed input section 147. In this embodiment, K=20, but greater or smaller dimensions may be used. For all the 31 applications for the feature extractor 140, the input 148 to the feature analyzer 150 is a concatenation of the sections 147 so that the feature analyzer 150 has 31*K=620 input values.

In an alternative embodiment, a section 143 corresponding to the 325 ms. input is processed, but only a subsampling of the applications of the feature extractor 140 are used. As an example, every other application of the feature extractor is used so that instead of 31 applications, only 16 are used, and the feature analyzer 150 has 16*K=320 values as input.

Continuing to refer to FIG. 1, each use of the feature analyzer 150 takes as input one processed input section 148, and produces one vector of state likelihoods 153. As with the feature extractor 140, the feature analyzer 150 forms an artificial neural network (ANN) in which a non-linear transformation is parameterized by weights of the ANN is used to transform the inputs to the outputs.

Figure 2:
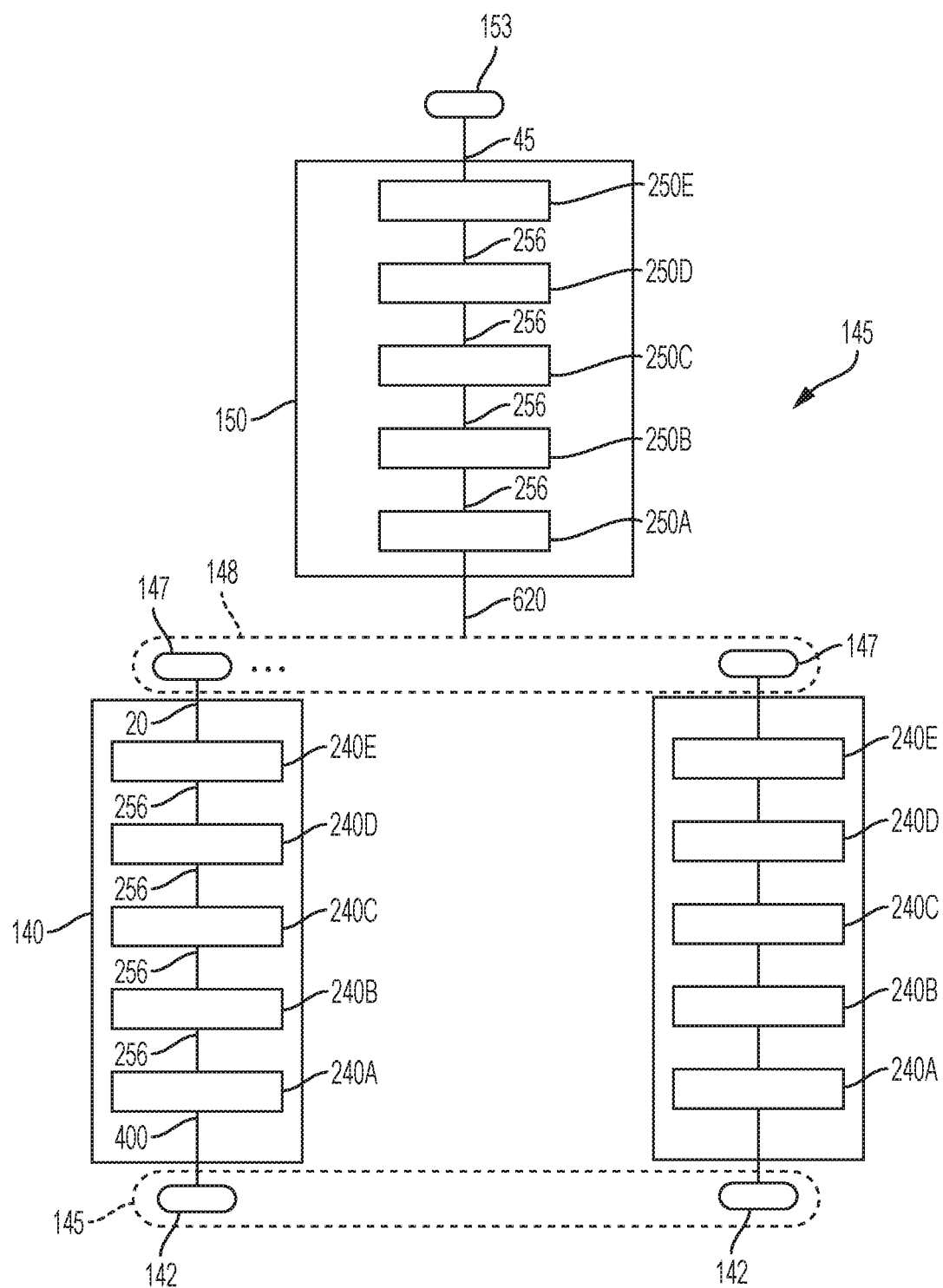
FIG. 2 is a diagram of a waveform processor.

Referring to FIG. 2, both the feature extractor 140 and feature analyzer 150 are implemented as multi-layer neural network, which may be considered to be "deep neural networks" (DNN). Each layer (240A-E, 250A-E) implements an affine transformation of the input values (viewed as a vector) to yield the output values (also viewed as a vector). That is, the computation performed at each layer of the neural network can be expressed mathematically as $y=Q(Ax+b)$, where x is an m-dimensional vector of inputs, A is a n×m matrix of weights, where n is the number of outputs, and b is a n-dimensional vector of biases, and $Q(\ )$ is a non-linear function, such as an elementwise sigmoid function or a soft-max function. The matrix A and bias b form the weights associated with that layer. Each successive layer uses the output of the previous layer as input.

In this embodiment, of the feature extractor 140, the input to the first layer 240A has 400 inputs (i.e., 400 sampled waveform values). The outputs of the first four layers 240A-D have 256 outputs, and the output of the fifth (output) layer 250E has the K=20 values introduced above. For the feature analyzer 150, the input to its first layer 250A has the 31*K=620 inputs, and the outputs of the first four layers 250A-D have 256 values, and the final layer 250E has N outputs corresponding to the N states. The non-linear function $Q(\ )$ at the final layer 250E implements a soft-max function such that all the outputs are in the range from 0.0 to 1.0 and the outputs sum together to 1.0, such that the output of the final layer has the character of a probability distribution. The specific number of layers, and the number of values passing between layers, may be different in alternative embodiments without departing from the overall approach.

It should be recognized that the combination of the feature analyzer 150 and the multiple instances of the feature extractor 140 can be viewed as an overall neural network with the constraint that the weights associated with each replicated instance of the feature extractor 140 are the same (i.e., the same set of weights are replicated).

Referring back to FIG. 1, in operation, in computing each successive vector of state likelihoods 153, the section of values 143 is shifted by 10 ms. However, only one new processed input segment 147 corresponding to a new section 142 needs to be computed in the waveform processor 145 because the others were computed in the previous applications of the waveform processor 145 to previous sections 143.

The successive state likelihoods 153 are processed in sequence by a recognizer 160. In the present embodiment, the recognizer 160 is implemented as a Hidden Markov Model (HHM) which, for each input vector of state likelihoods 153, updates an estimate of a vector of state scores 163 based on the succession of inputs state likelihoods 153 for the utterance up to the current input. The term "state score" is used to denote a quantity that represents a certainty that, based on the input waveform processed to that point, the HMM is in that state (e.g., effectively that the corresponding acoustic unit is being uttered at that time). Therefore, the HMM recognizer may be considered to be "sequence recognizer" that integrates the information from a history of input state likelihoods 153. Further details related to the operation of the HMM-based recognizer 160 are provided below. However, it should be recognized that other forms of recognizers may be used, for example, based on recurrent neural network approaches. Also, in some embodiments, the recognizer 160 may be omitted in that for each input state likelihoods 153, the output state scores 163 may be essentially equal to or a memoriless transformation of the input.

As introduced above, the recognizer 160 provides as output a sequence of state scores 163. One of the states of the HMM corresponds to the end of a trigger word, and different groups of states correspond to different sub-word units that make up the trigger word. For example, in an example that uses phonetic sub-word units, each phonetic sub-word unit may be associated with three states. The recognizer monitors the value of the score of the last state of the trigger word in successive state scores 163. Each of the state scores 163 comprises a vector of real numbers, with each element of the vector corresponding to a different state of the HMM. Upon occurrence of a local maximum of the state core of the last state of the trigger word within a sliding window, the recognizer declares that the trigger word may have occurred at that input (i.e., at a time in the acoustic signal corresponding to the current input section 143 of the sampled waveform being processed). The recognizer also uses its working memory (traceback state) to identify a starting time corresponding to the ending time of the trigger word, as well as the segmentation of the interval from the start time to the end time according to the sub-word units of the trigger word, which are illustrated as a data structure 168 representing the segments 169 in FIG. 1.

A trigger detector 170 receives the data structure 168 corresponding to the possible occurrence of the trigger word, including the start and end times, the sub-word unit segmentation, as well as the state scores 163 for the times in the possible occurrence of the trigger word, and outputs an indicator 173 of whether the trigger word indeed occurred. This indicator may be a binary classification (i.e., trigger word is present as a true occurrence vs. not present) and may include a score that indicates a degree of confidence that the trigger word truly occurred. It should be recognized that the indicator that the trigger word truly occurred may still have errors, however use of the trigger detector output provides a more accurate decision than merely using the HMM-based detection of the trigger word.

As discussed further below, internally, the trigger detector performs a segmental feature computation, which forms fixed-length segment parts of features associated with each segment 169 (i.e., subword unit) of the trigger word, generates a fixed number of values representing the possible occurrence of the trigger word, and applies a parameterized transformation that processes these values to determine the output indicator 173. In this embodiment, this transformation is implemented a Support Vector Machine (SVM), however it should be recognized that other types of classification or transformation may be used, for instance, an ANN, or a classification/regression tree (CART).

In summary of the run-time operation of the trigger word detection approach, as the sample waveform 123 is acquired, successive sections 142 are processed by the feature extractor 145, yielding successive processed sampled values 147, which are used to form the concatenated inputs 148 to the feature analyzer 150. For each input 148, the feature analyzer 150 outputs corresponding state likelihoods 153, and successive state likelihoods 153 are processed by the recognizer 160 to produce corresponding successive state scores 163 and the associated detection time of the trigger word and its segments. The trigger detector 170 then processes the state scores 163 and the segmentation data structure 168 to yield the overall indicator 173 for the presence of the trigger word at the detection time.

As introduced above, the feature extractor 140 is parameterized with a set of neural network weights, and the features analyzer 150 is parameterized by another set of neural network weights. These weights may be determined (i.e., trained) using a number of different procedures, generally making use of iterative updating approaches based on gradient computations, such as stochastic gradient descent and backpropagation or other gradient-based incremental-updating procedure. A particular way to determine these two sets of weights makes use of a series of three phases, in each phase using a multi-task training approach as described below. The three phases are:

1) determine the weights for the feature extractor 140 using a "bottleneck" training approach;
2) using the weights from (1) without updating them, determine weights for the feature analyzer 150; and
3) update the combination of the feature extractor 140 and feature analyzer 150 in a combined training approach.

Each of these phases is described in more detail below.

Figure 3:
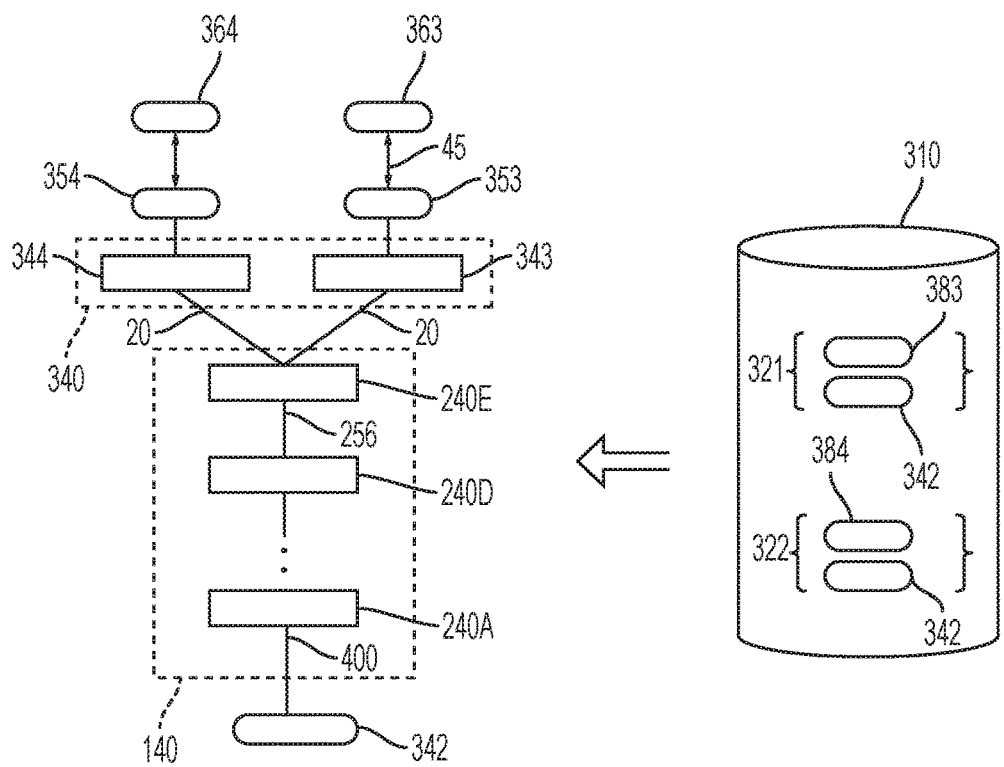
FIG. 3 is a diagram illustrating feature extractor training.

Referring to FIG. 3, the first phase of training is directed at determining the weights of the feature extractor 140. A database 310 of reference data includes a data set 321 of paired trigger word recognizer states 363 and sections 342 of sampled waveforms (i.e., paired states and sections of waveform data). Each section of sampled waveforms 342 has the same size (i.e., 400 samples) as a section 142 of the processed sampled waveform shown in FIG. 1, and is produced in the same manner as the section 142, for example, using the same or similar configuration of an AFE 130, and a similar acoustic environment. The recognizer states 363 have the same number of elements as the state likelihoods 153. In some examples, the elements of the vector 363 are all 0.0 except for a single state for which the value is 1.0, and this state corresponds to an association (alignment) of an input utterance from which the sampled waveform section 342 is obtained and the states of the Markov chain model used by the recognizer 160. In some examples, the elements of the vector form a probability distribution representing a "soft" assignment where elements are between zero and one. One goal of the training procedure is that the weights of the neural network are selected such that for an input 342, the output 353 of the neural network matches the reference output 363. In particular, the degree of match is computed as a cross-entropy between the reference output 363 and the produced output 353.

Note that in FIG. 3, the feature extractor 140 is augmented such that the output of the top layer 240E passes to a further layer 343 to produce the output 353. This extra layer implements a soft-max output such that the output 353 has the character of a probability distribution. Because the number of outputs of the feature extractor (i.e., K=20) is significantly smaller than the number of outputs of the extra layer 343, this output layer 240E is referred to as a "bottleneck" layer in that all the information that is represented in the output 353 is represented in the smaller number of values emitted from the top layer 240E. Note that in training, both the weight of the feature extractor 140 and the weights of the augmented layer 343 are together iteratively updated. Ultimately the weights of the augmented layer are discarded and only the weights of the feature extractor 140 are retained.

The training procedure illustrated in FIG. 3 uses a "multi-task" approach in which the database 310 includes a second data set 322 of paired input waveform sections 342 and output state distributions 364. Whereas the data set 321 corresponds to the trigger word detection task, with the states corresponding to the states of the recognizer 160, the second data set 322 corresponds to a different task, in this embodiment to a large vocabulary continuous speech recognition (LVCSR) task, which has a larger number of states. The feature extractor 140, and added layer 344, are trained to best match the output 354 to the reference output 364, again using a cross-entropy measure.

In the iterative updating procedure, the weights are updated so that a weighted combination of the average cross entropy for the trigger word data set 321 and the average cross entropy for the LVCSR data set 322 is reduced. In some embodiments, a gradient based approach (e.g., Back-propagation) or a stochastic gradient approach is used to determine the incremental updates of the weights at each iteration. In some embodiments, a layer-by-layer approach to training is used in which first a one-layer network is trained, and then after training that layer, a further layer is added, for example, with random weights, then the weights of the added layer are updated, and then the weights of the entire network are updated. This process of adding a layer is repeated until the desired number of layers are reached. Note that a reduction in cross entropy corresponds to a closer match between the data; however other cost or loss functions may be used in the updating procedures, for example, based on a L1 or a L2 norm between the vectors rather than a cross-entropy.

Before the iteration begins, the weights may be initialized to random values, or may be initialized to values determined in another procedure, for example, determined to match an alternative feature extraction approach as described below. A variety of control approaches may be used in the iterative updating, include dividing the data into "mini-batches" and updating all the weights after each mini-batch.

Figure 4:
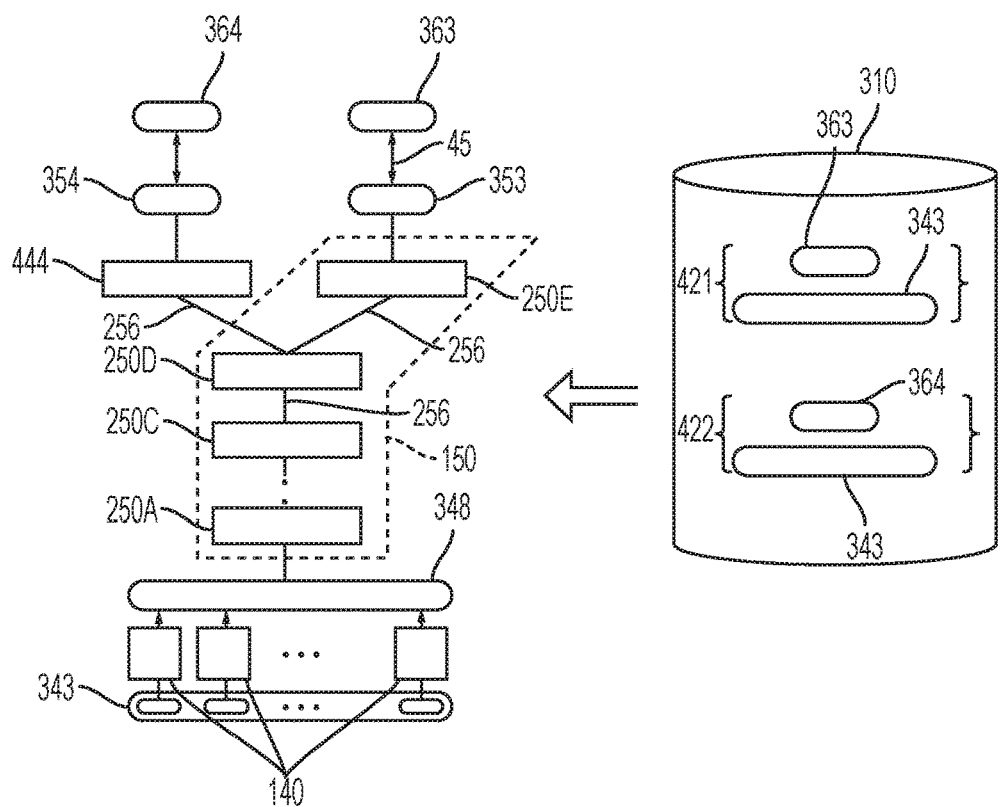
FIG. 4 is a diagram illustrating feature analyzer training, and combined training of the feature analyzer and feature extractor.

Referring to FIG. 4, the second phase of training uses a similar approach to determine the weights of the feature analyzer 150 as is used to determine the weights for the feature extractor 140. In this case, the database 310 includes a data set 421 that represents sections 343 of a sampled waveform and corresponding recognizer states 363. Note that the sections 343 correspond to the sections 143 shown in FIG. 1, and therefore provide a large time context than the sections 342 used in the first phase training. That is, an in-order sequence of the smaller sections 342 of the reference waveform samples that make up the section 343 must be retained, and therefore random selection of pairs from the data set 321 is not sufficient for this phase on training. In this phase of training, the weights of the feature extractor 140 are fixed at the values determined in the first phase, and the weights of the feature analyzer 150 are updated. That is, the multiple instances of the feature extractor 140, configured with the first phase weights, are used to process each segment 343 of the reference sampled waveform. The outputs of the instances of the feature extractors 140 form the input 348 to the feature analyzer 150. As in the first phase training, the weights of the feature analyzer 150 are updated according to a cross-entropy criterion between the reference state values 363 and the outputs 353 of the feature extractor. Also, as in the first phase, a multi-task training approach is used such that a second data set 422 represents sections 343 of a reference LVCSR data paired with reference states 364. An added layer 444 is coupled to the second to last layer 250D of the feature analyzer to produce the outputs 354, which are matched to the reference states 364. As in the first phase, the weights of the feature analyzer 150 an added layer 444 are updated using a gradient computation approach and a cross-entropy criterion. In some examples, the weights of the feature analyzer 150 are initialized to random values. In some alternatives, a layer-wise pre-training is performed prior to updating of the entire feature analyzer 150.

A third phase of training also uses the configuration shown in FIG. 4. However, rather than treating the weights of the feature extractors 140 as fixed as in the second phase, they are updated along with the weights of the feature analyzer 150. Note that although the weights of the feature analyzer 140 are updated, the weights of each of the instances are assumed to be the same, so that only one set of feature analyzer weights are determined. The third phase otherwise follows that same procedure as the second phase.

Upon completion of the third phase, the weights of the feature analyzer 140 and feature extractor 150 are used to configure the runtime audio devices that incorporate the trigger detection approach.

Figure 5:
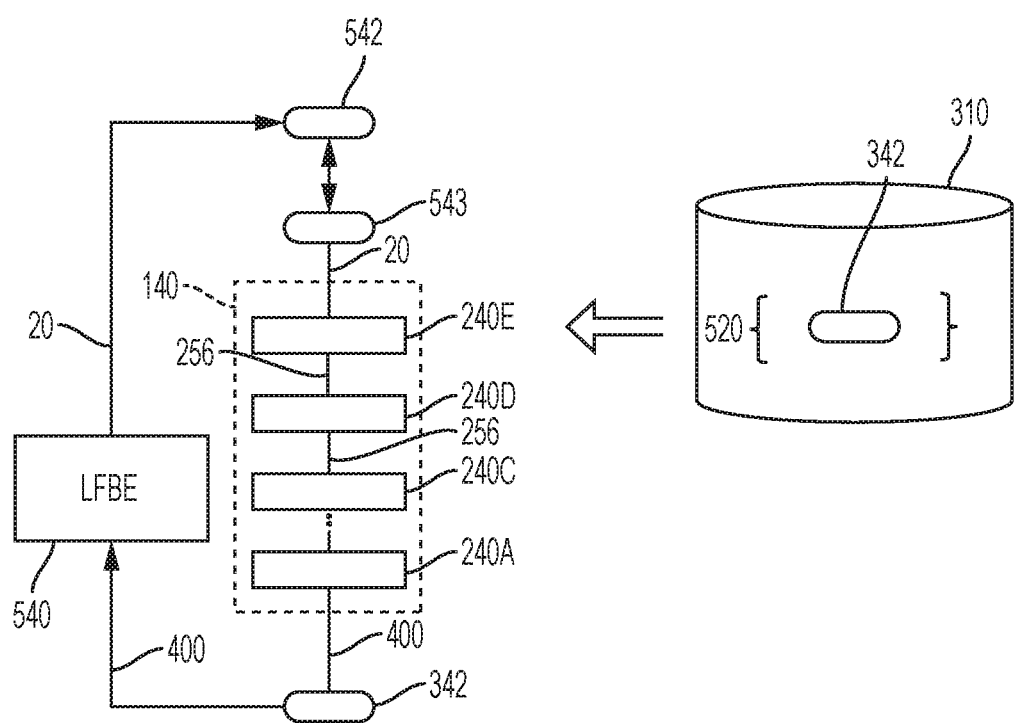
FIG. 5 is a diagram illustrating training of a feature extractor to match another feature extractor.

Referring to FIG. 5, in some embodiments, the feature extractor 140 is trained in a manner to approximate another feature extraction approach. For example, a log frequency band energy (LBFE) feature extractor implements a 20-band filter of each input segment and outputs the logarithm of the energy in each of the bands. Other feature extractors may be used instead of the LFBE feature extractor, for example, computing LPC confidence, Cepstra of the sampled waveform input, etc. In this training of the feature extractor, the database 310 includes a data set 520 that includes segments 342 of waveform samples. In training, each segment 342 is processed by the LFBE feature extractor 540 to produce output features 542, which has K=20 values. The weights of the feature extractor 140 are iteratively updated to minimize a difference between the output 543 of the feature extractor 140 and the output of the LFBE feature extractor 540. In some embodiments, the difference is computed as the sum of the elementwise squared differences, however other difference functions may be used, such as sum or maximum of absolute differences between elements.

In an alternative training approach, the training discussed above with reference to FIG. 5 is used prior to the first phase of the three-phase approach discussed above as an alternative to initializing the weights of the feature extractor 140 at random values. In another alternative, the training illustrated in FIG. 5 is used instead of the first phase, and then only the second phase in which the feature analyzer 150 is trained is performed. In another alternative, this training of the feature extractor 140 is performed, followed by both phase 2 and phase 3 of the training described above.

Figure 6:
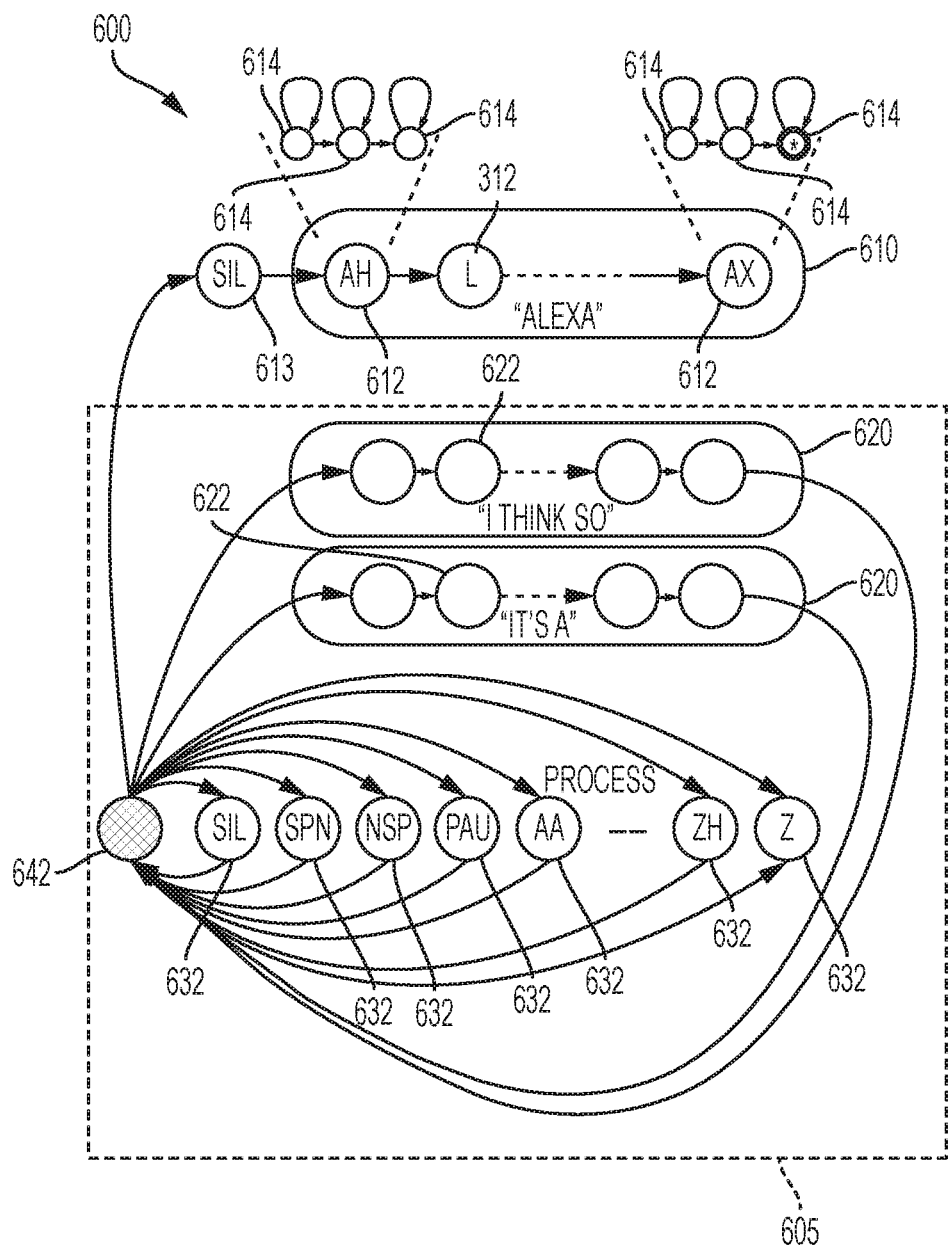
FIG. 6 is a recognition network.

Returning to FIG. 1, as introduced above, the recognizer 160 uses a Hidden Markov Model (HMM) approach that uses a Markov chain model (i.e., a finite state transition network with transition probabilities). Referring to FIG. 6 a state transition network 600 for the HMM includes a background model section 605 and a trigger word section 610. The trigger word section 610 includes a network of subword units 612, for example as illustrated, a "left-to-right" linear network representing the word "Alexa." It should be understood that more complex networks that account for alternative pronunciations may be used. Furthermore, although the term "trigger word" is used throughout this description, it would be understood that the "word" may be a multiple word phrase (e.g., "Hi Alexa"), and furthermore, the trigger word network may represent alternative word sequences (e.g., "Alexa," "Computer," "Hi Alexa," or "Hi Computer"). Each subword unit 612 is made up of a network of HMM states 614. In this example, each subword unit network has three states 614, arranged in a "left-to-right" network, which constrain the state sequence to have one or more occurrences of the "left" state, followed by one or more occurrences of the "center" state, followed by one or more occurrences of the "right" states (recognizing that in alternative embodiments, units may have only a single state or two states, or other topologies).

In other embodiments, different type of networks for the subword units may be used, for example, with a different number of states, or with optional skipping of certain of the states. Furthermore, it is not required that all subword units in the network 600 have the same structure. The last state 615 of the last subword unit 612 of the trigger word 610, which is identified with an "*" in the Figure, represents the last state of the trigger word. During processing, an end of an utterance of the trigger word corresponds to the HMM being that state. In the network 605 shown in FIG. 6, the trigger word 610 is required to be preceded by states of a "silence" state 613. That is, the system is configured to detect occurrences of the trigger word only when they follow a silence period as opposed to being embedded within an utterance.

The background model 605 of the network includes subword units 632 that together generally cover the sounds that occur in speech being processed by the system. In this embodiment, these units 632 generally correspond to English language phonemes, however other sets of linguistically motivated or non-linguistic data-derived units may be used. For linguistically motivated units, phonemes from other languages, or a set of language-independent phonemes covering many languages may be used. Other units such as diphones, syllables, demi-syllables, phoneme classes, etc. may also be used without altering the approach described below. Furthermore, the units themselves may be identified in an unsupervised manner by processing data, for example, using "fenones" or clustering of similar segments of speech. In FIG. 6, the network permits any sequence of the subword units 632. A "null" state 642 is included to allow transition via the null state without accounting for any input being processed by the HMM. That is, the null state 642 essentially provides a simplification of the connectivity of the states without having to explicitly enumerate all the possible state transitions. In this embodiment, the subword units includes 40 English phonemes, "AA" through "Z," as well as several additional units including "silence" (SIL), general speech (SPN), general non-speech (NSP), and interword pauses (PAU). Therefore, there are a total of 44 subword units 332.

The background model 605 optionally includes confusable words and phrases 620. If FIG. 6, two such confusable words or phrases 320 are shown: "I think so", and "it's a". Each of the confusable words or phrases 320 is made up of a network of subword units 322 representing the corresponding word or phrase. For example, the subword units 322 are English phonemes selected and arranged according to dictionary pronunciations of the words.

During operation, as presented above, the feature analyzer 150 provides successive state likelihoods 153 to the HMM, which computes the state scores using the present and past state likelihoods 153 using an iterative updating procedure, in this embodiment a Viterbi updating procedure. During the Viterbi update procedure, for each input, the state scores are updated, and a most likely sequence of past states leading to each current state is maintained in a traceback data structure. The score of the last state 614 of the trigger word is tracked to locate a local maximum, which is also a maximum over a sliding window. Having located the local maximum of the score, the traceback structure is used to determine the most likely sequence of states leading to the last state of the trigger word at that time. Because each state is associated with a phoneme 312, the start and end times of each of the phonemes are determined using this most likely state sequence.

Referring back to FIG. 1, the trigger detector 170 computes values of a fixed set of features based on the state scores 163 and start and end times of the phonemes of the detected trigger word. One or more of the following features are computed for each of the phonemes of the trigger word: duration of the phoneme; relative duration of the phoneme to the entire trigger word; average state score; relative score of the phoneme compared to the score for the segment of input using the background model; and comparison of the score of the phoneme to the score for the segment of input using the adjacent phonemes of the trigger word. In some embodiments, the comparison uses an entropy based computation of the relative scores.

The computed features for each of the trigger word phonemes are combined with comparable scores for the trigger word as a whole to form a fixed-length representation of the possible occurrence of the trigger word. The detector includes a classifier, for example, a Support Vector Machine (SVM) or artificial neural network based classifier that accepts this fixed-length representation and outputs the detector output 173. This classifier is parameterized, with the parameters being estimated along with the weights of the feature extractor and feature analyzer neural network using a training data set of true occurrences of the trigger word as well as false alarms that have been detected by the HMM recognizer but are not in fact true occurrences of the trigger word. In some embodiments, a further phase of training is performed such that the classifier parameters are updated along with the weights of the waveform processor 145 in an end-to-end training of the trigger detection approach. For example, a gradient-based training approach may update parameters of the trigger detector 170 and the waveform processor 145 in a combined iteration (e.g., with neural network weights of both the detector 170 and processor 145 being updated in each iteration of an iterative procedure).

Figure 7:
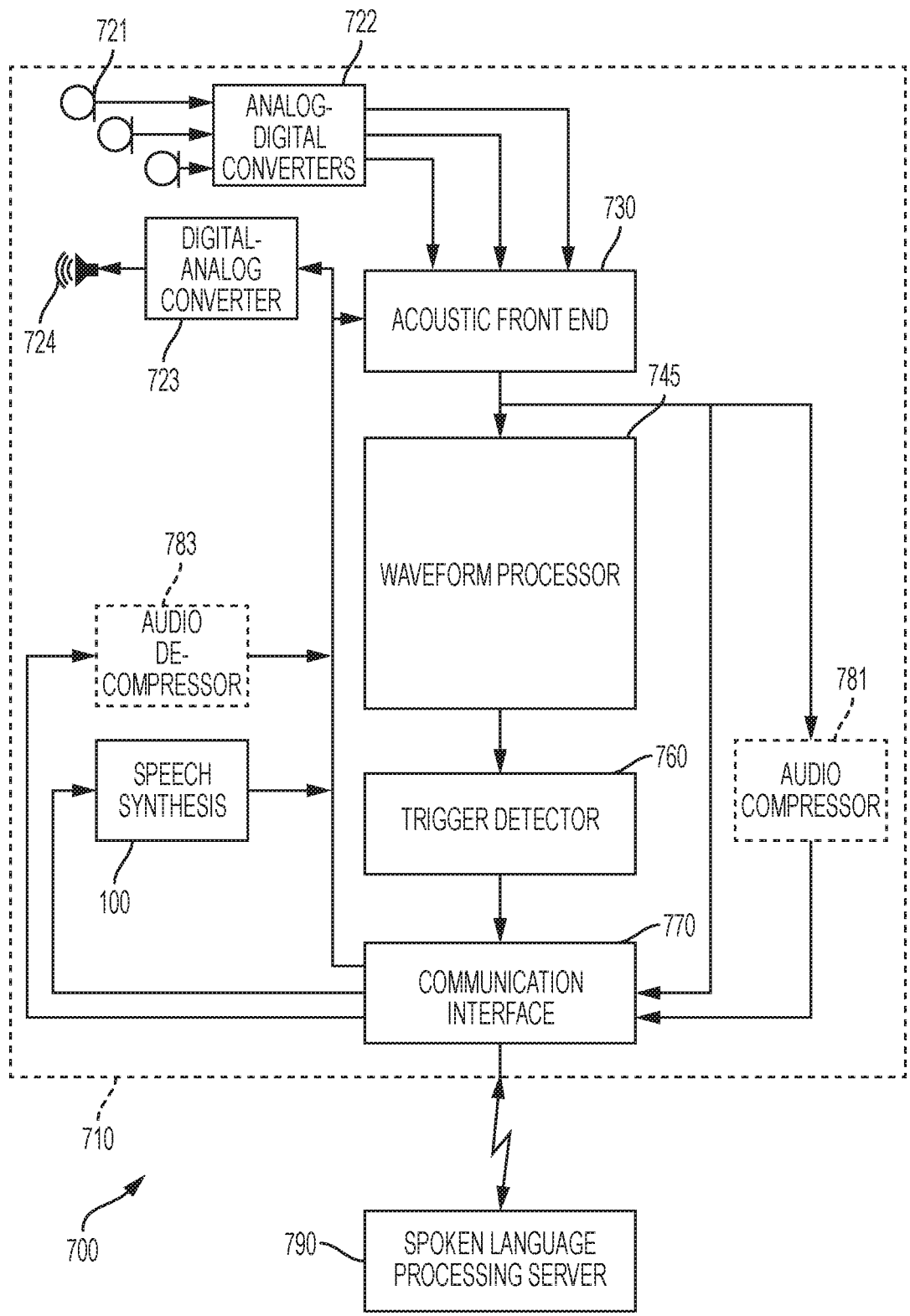
FIGS. 7-8 are a block diagram a speech enabled system.

Referring to FIG. 7, in an example an interactive system 700, which makes use of the techniques described above, includes an audio user interface device 710 ("user device") and a spoken language processing system 790 ("speech server"), which is generally distant from the user device 710 and in data communication with the device over a network, for instance over the public Internet. The user device 710 includes one or more microphones 721, which sense an acoustic environment in which the user device 710 is placed. For example, the user device 710 may be placed in a living room of a residence, and the microphones acquire (i.e., sense) an acoustic signal in the environment and produce corresponding analog or digital signals, where the acoustic signal may include speech and non-speech sounds. Users in the environment may interact with the system 700. One way for a user to indicate to the system that he or she wishes to interact is to speak a trigger (where "trigger" is used to denote something that initiates a process or reaction), where the trigger may be a predetermined word or phrase (which may be referred to as a "wakeword", or a "trigger word") or some other acoustically distinct event. This trigger is detected by the device 710, and upon detection of the trigger at a particular time (e.g., a time instance or interval), the device passes audio data (e.g., a digitized audio signal or some processed form of such a signal) to a spoken language processing server 790. The device 710 selects a part of the audio data corresponding to a time including an interval of the acoustic signal from a starting time and an ending time, for example, based on an estimate of the time that the trigger began in the acoustic signal and based on a determination that input speech in the acoustic signal has ended. This server processes and interprets the user's acoustic input to the device 710 (i.e., the user's speech input) and generally provides a response to the device for presentation to the user. The presentation of the response may in the form of audio presented via a speaker 724 in the device.

Figure 8:
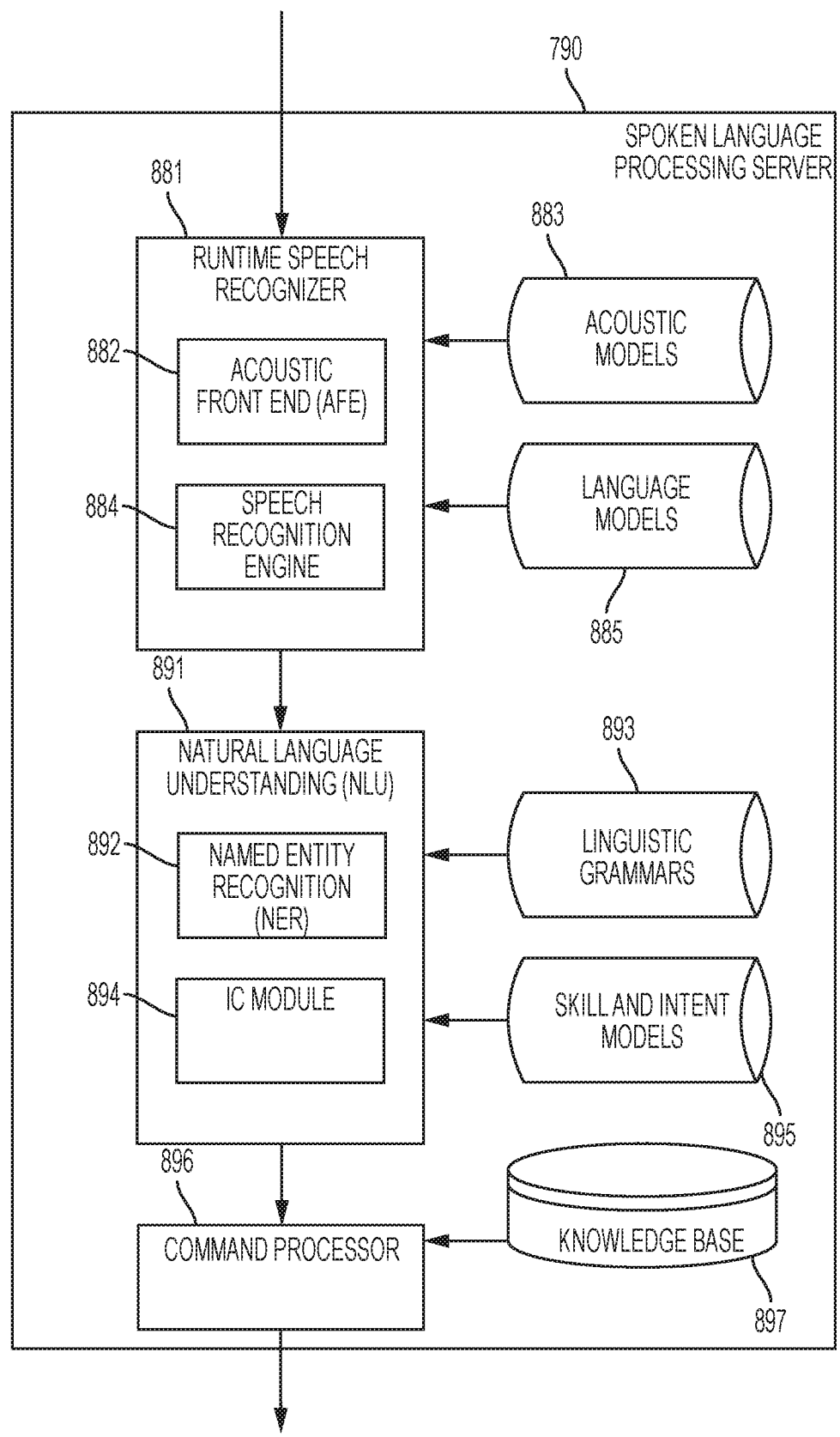

In FIG. 8, the communication interface 770 may receive information for causing the audio output to the user. For example, the interface may receive the phoneme sequence which is presented as the control signal to the speech synthesis system 100, implemented in the user interface device. Operating as described above, the speech synthesis system computes the output waveform, which is passed to the digital-to-analog converter 723, causing acoustic output via the speaker. In an alternative embodiment (not illustrated), the speech synthesis system 100 may be hosted in the spoken language processing system 790 (or yet another server), and the communication interface may receive the computed waveform for presentation via the digital-to-analog converter 723 and speaker 724. In some embodiments, the waveform may be compressed, and the compressed waveform is received at the communication interface 770 and passed via an audio de-compressor 783 prior to digital-to-analog conversion.

Returning to the processing of an input utterance by the user, there are several stages of processing that ultimately yield a trigger detection, which in turn causes the device 710 to pass audio data to the server 790. The microphones 721 provide analog electrical signals that represent the acoustic signals acquired by the microphones. These electrical signals are time sampled and digitized (e.g., at a sampling rate of 20 kHz and 16 bits per sample) by analog-to-digital converters 722 (which may include associated amplifiers, filters, and the like used to process the analog electrical signals). As introduced above, the device 710 may also provide audio output, which is presented via a speaker 724. The analog electrical signal that drives the speaker is provided by a digital-to-analog converter 723, which receives as input time sampled digitized representations of the acoustic signal to be presented to the user. In general, acoustic coupling in the environment between the speaker 724 and the microphones 721 causes some of the output signal to feed back into the system in the audio input signals.

An acoustic front end (AFE) 730 receives the digitized audio input signals and the digitized audio output signal, and outputs an enhanced digitized audio input signal (i.e., a time sampled waveform). An embodiment of the signal processor 730 may include multiple acoustic echo cancellers, one for each microphone, which track the characteristics of the acoustic coupling between the speaker 724 and each microphone 721 and effectively subtract components of the audio signals from the microphones that originate from the audio output signal. The acoustic front end 730 also includes a directional beamformer that targets a user by providing increased sensitivity to signal that originate from the user's direction as compared to other directions. One impact of such beamforming is reduction of the level of interfering signals that originate in other directions (e.g., measured as an increase in signal-to-noise ratio (SNR)).

In alternative embodiments, the acoustic front end 730 may include various features not described above, including one or more of: a microphone calibration section, which may reduce variability between microphones of different units; fixed beamformers, each with a fixed beam pattern from which a best beam is selected for processing; separate acoustic echo cancellers, each associated with a different beamformer; an analysis filterbank for separating the input into separate frequency bands, each of which may be processed, for example, with a band-specific echo canceller and beamformer, prior to resynthesis into a time domain signal; a dereverberation filter; an automatic gain control; and a double-talk detector.

In a second stage of processing, a waveform processor 745 (e.g., using the approach illustrated in FIG. 1) converts the digitized audio signal (i.e., a sampled waveform) to a sequence of recognizer state likelihoods. Each entry of one of the state likelihoods in the sequence is associated with a particular part of a linguistic unit, for example, part of an English phoneme. For example, the state likelihoods may each include 3 entries for each phoneme of a trigger word (e.g., 3 outputs for each of 6 phonemes in a trigger word "Alexa") plus entries (e.g., 2 entries or entries related to the English phonemes) related to non-trigger-word speech. State likelihoods may be provided to the trigger detector at a rate of one of the state likelihoods every 10 milliseconds.

The communication interface receives an indicator part of the input (e.g., the frame number) corresponding to the identified trigger. Based on this identified part of the input, the communication interface 770 selects the part of the audio data (e.g., the sampled waveform) to send to the server 790. In some embodiments, this part that is sent starts at the beginning of the trigger, and continues until no more speech is detected in the input, presumably because the user has stopped speaking. In other embodiments, the part corresponding to the trigger is omitted from the part that is transmitted to the server. However, in general, the time interval corresponding to the audio data that is transmitted to the server depends on the time interval corresponding to the detection of the trigger (e.g., the trigger starts the interval, ends the interval, or is present within the interval).

Referring to FIG. 8 processing at the spoken language server 790 may include various configurations for processing the acoustic data (e.g., the sampled audio waveform) received from the audio interface device 710. For example, a runtime speech recognizer 881 uses an acoustic front end 882 to determine feature vectors from the audio data. These may be the same feature vectors computed at the interface device 710, or may be a different representation of the audio data (e.g., different numbers of features, different number per unit time, etc.). A speech recognition engine 882 processes the feature vectors to determine the words in the audio data. Generally, the speech recognizer 881 attempts to match received feature vectors to language phonemes and words as known in the stored acoustic models 883 and language models 885. The speech recognition engine 884 computes recognition scores for the feature vectors based on acoustic information and language information and provides text as output. The speech recognition engine 884 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following processing by the runtime speech recognizer 881, the text-based results may be sent to other processing components, which may be local to the device performing speech recognition and/or distributed across data networks. For example, speech recognition results in the form of a single textual representation of the speech, an N-best list including multiple hypotheses and respective scores, lattice, etc. may be sent to a natural language understanding (NLU) component 891 may include a named entity recognition (NER) module 892, which is used to identify portions of text that correspond to a named entity that may be recognizable by the system. An intent classifier (IC) module 894 may be used to determine the intent represented in the recognized text. Processing by the NLU component may be configured according to linguistic grammars 893 and/or skill and intent models 895. After natural language interpretation, a command processor 896, which may access a knowledge base 897, acts on the recognized text. For example, the result of the processing causes an appropriate output to be sent back to the user interface device for presentation to the user.

The command processor 896 may determine word sequences (or equivalent phoneme sequences, or other control input for a synthesizer) for presentation as synthesized speech to the user. The command processor passes the word sequence to the communication interface 770, which in turn passes it to the speech synthesis system 100. In an alternative embodiment the server 790 includes a speech synthesis system, and the command processor causes the conversion of a word sequence to a waveform at the server 790, and passes the synthesized waveform to the user interface device 710.

Figure 9:
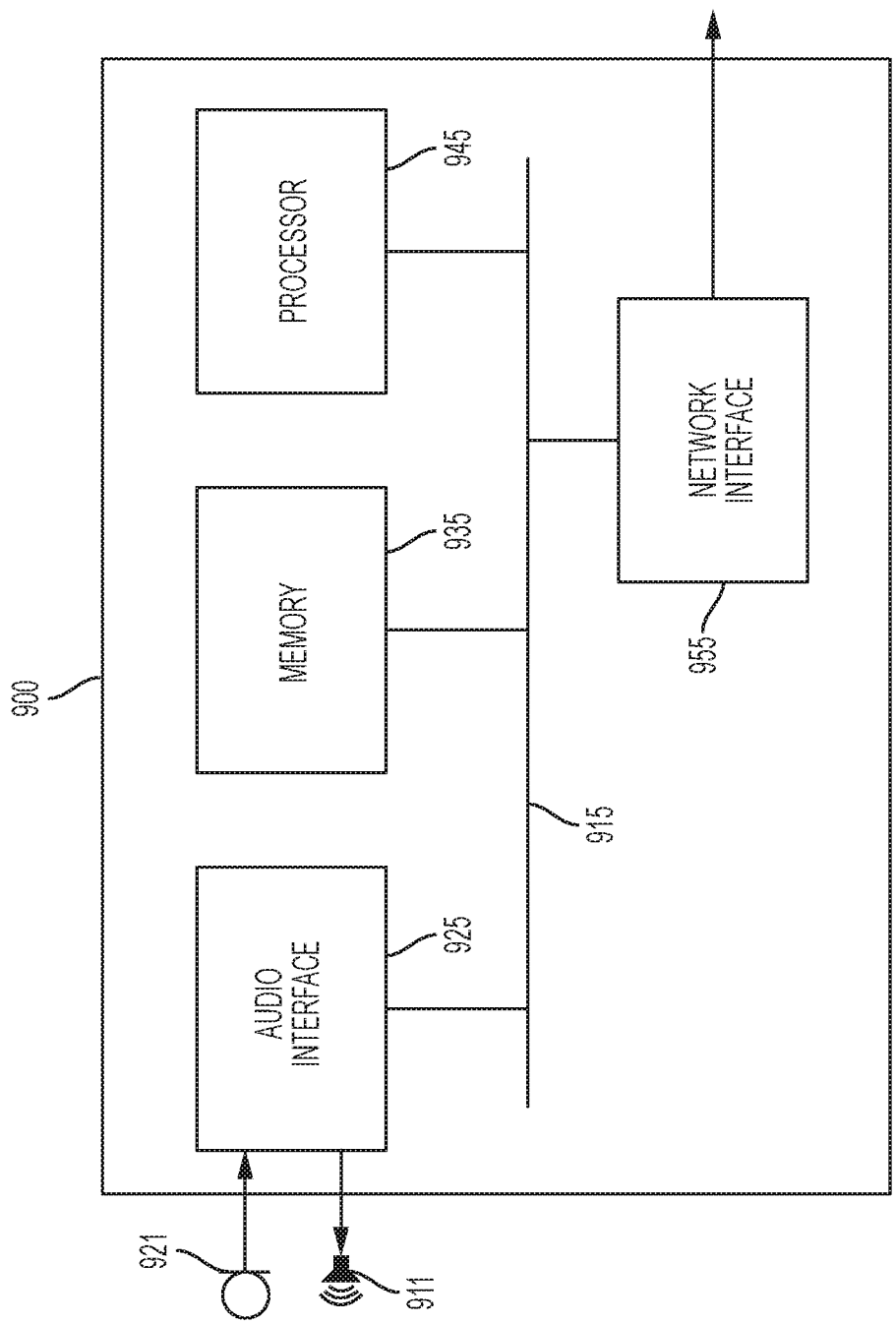
FIG. 9 is a hardware configuration of the audio-based device.

Referring to FIG. 9, a hardware configuration of the user device 710 of FIG. 7 may include a bus 915, which interconnects a memory 935 and a processor 945. The memory may store instructions, which when executed by the processor perform functions described above, including the computations for implementing the artificial neural networks. In addition, the bus may have an audio interface 925 coupled to it, permitting the processor to cause audio input and output to the passed via the microphone 921 and speaker 911, respectively. A network interface 955 may be coupled to be bus for communicating with remove systems, such as the remote system 990.

It should be understood that the waveform processing described in the context of speech recognition for trigger word detection may also be applied to other speech recognition tasks. For example, as described in the multi-task training approach, LVCSR data sets are used. Therefore, the LVCSR components of the training may be used with an LVCSR recognizer rather than with the trigger word detection recognizer as described with reference to FIG. 1.

Other embodiments may use somewhat different configurations, for example, with different sampling rates, numbers of inputs and outputs for neural networks, and number of hidden layers in the neural networks, without departing from the underlying nature of the approach. Furthermore, although embodiments described above use waveform samples as input, other fine time-scale and substantially lossless representations of speech signal may be uses, for example, based on invertible transformations such as a Fourier or Wavelet Transform. As introduced above, it is also not essential that the recognizer use a Hidden Markov Model approach, and indeed, certain embodiments may omit the recognizer entirely, or use a structure such as a recurrent neural network.

The approaches described above may be implemented in software, in hardware, or using a combination of software and hardware. For example, the software may include instructions stored on a non-transitory machine readable medium that when executed by a processor, for example in the user interface device, perform some or all of the procedures described above. Hardware may include special purpose circuitry (e.g., Application Specific Integrated Circuits (ASICs), Field Programmable Gate Arrays (FPGAs) and the like) for performing some of the functions. For example, some of the computations for the neural network transformations may be implemented using such special purpose circuitry.

It is to be understood that the foregoing description is intended to illustrate and not to limit the scope of the invention, which is defined by the scope of the appended claims. Other embodiments are within the scope of the following claims.

What is claimed is:

1. A method for detecting a trigger word in a speech signal, the method comprising:

receiving input data representing a speech signal acquired by a microphone in an acoustic environment, the input comprising input waveform values;

processing the input waveform values to produce first state likelihoods, including processing a first section of waveform values corresponding to a first time in the speech signal, the processing of the first section of waveform values including providing first state likelihoods associated with the first time, the state likelihoods including values associated with respective recognizer states, the processing of the first section of waveform values including processing a plurality of sections of waveform values within the first section of waveform values with a first artificial neural network to produce respective processed input sections, combining the processed input sections to form an input to a second artificial neural network, and processing the input to the second neural network with the second artificial neural network to produce the first state likelihoods associated with the first time;

processing, using a speech recognizer, a plurality of likelihoods output from the second neural network, which includes the first state likelihoods associated with the first time, wherein the processing includes identifying a plurality of segments of the input data, each segment having a corresponding time extent in the speech signal, and
each segment corresponding to a part of a first possible occurrence of the trigger word;
forming a classifier input based on the segments identified by the speech recognizer and state likelihoods output from the second neural network;
determining, using a classifier, a classifier output that depends on the classifier input; and
determining that the trigger word is present at the first time based on the classifier output.

2. The method of claim 1 wherein the classification input includes at least a first segment part corresponding to a first segment of the plurality of segments corresponding to the first possible occurrence of the trigger word, the first segment part being formed using outputs from the second neural network for a time in the time extent of the corresponding to the first segment.

3. The method of claim 1 further comprising configuring the first artificial neural network and the second artificial neural network using reference data representing paired recognizer states and sections of waveform data, the configuring including:
determining first weights for the first artificial neural network based on the sections of waveform data of the reference data;
determining second weights for the second artificial neural network, without updating the first weights, based on the paired recognizer states and sections of waveform data of the reference data; and
after the determining of the first weights and the second weights, updating the first weights and the second weights based on the paired recognizer states and sections of waveform data of the reference data.

4. The method of claim 3 wherein the determining of the first weights, the determining of the second weights, and the updating of the first weights and the second weights, each includes applying a gradient-based incremental-updating procedure.

5. The method of claim 1 further comprising, after determining that the first possible occurrence of the trigger word is a true occurrence the trigger word, transmitting the input data to a server for further processing.

6. The method of claim 1 wherein the first neural network is implemented using a first convolutional neural network.

7. The method of claim 6 wherein the first convolutional neural network is configured to process sections of waveform values corresponding to sections of at least 25 ms. of the speech signal.

8. The method of claim 7 wherein the input to the second neural network corresponds to at least 325 ms. of the speech signal.

9. The method of claim 1 further comprising:
accessing reference data representing paired states and sections of waveform data;
determining first parameter values for the first neural network based on the sections of waveform data of the reference data;
determining second parameter values for the second neural network, without updating the first parameter values, based on the paired states and sections of waveform data of the reference data; and
after the determining of the first parameter values and the second parameter values, further updating the first parameter values and the second parameter values based on the paired recognizer states and sections of waveform data of the reference data.

10. The method of claim 9 wherein the determining of the first parameter values, the determining of the second parameter values, and the updating of the first parameter values and the second parameter values, each includes applying a gradient-based incremental updating procedure.

11. The method of claim 9 wherein determining first parameter values for the first neural network comprises determining the first parameters values such that the first neural network approximates a predetermined waveform processing approach of the waveform data.

12. The method of claim 9 wherein determining first parameter values for the first neural network comprises determining the first parameters values based on the paired states and sections of waveform data to best predict the recognizer states from the sections of waveform data of the reference data.

13. The method of claim 1 wherein the classifier input includes at least a first segment part corresponding to a first segment of the plurality of segments corresponding to the first possible occurrence of the trigger word, the first segment part being formed using outputs from the second neural network for a time in the time extent of the corresponding to the first segment.

14. The method of claim 1 wherein the classifier comprises a parameterized classifier.

15. The method of claim 1 wherein at least some of the segments each corresponds to a respective number of the sections of the waveforms, the number of sections of the waveform corresponding to the time extent of the segment identified using the recognizer.

16. The method of claim 1 wherein the trigger word includes a plurality of predefined parts, and each segment of the plurality of segments corresponds to one of the predefined parts of the trigger word.

* * * * *